T. JOHNSTON.
LOAD RETAINING DEVICE FOR LOGGING WAGONS.
APPLICATION FILED JUNE 12, 1913.
1,089,767.  Patented Mar. 10, 1914.
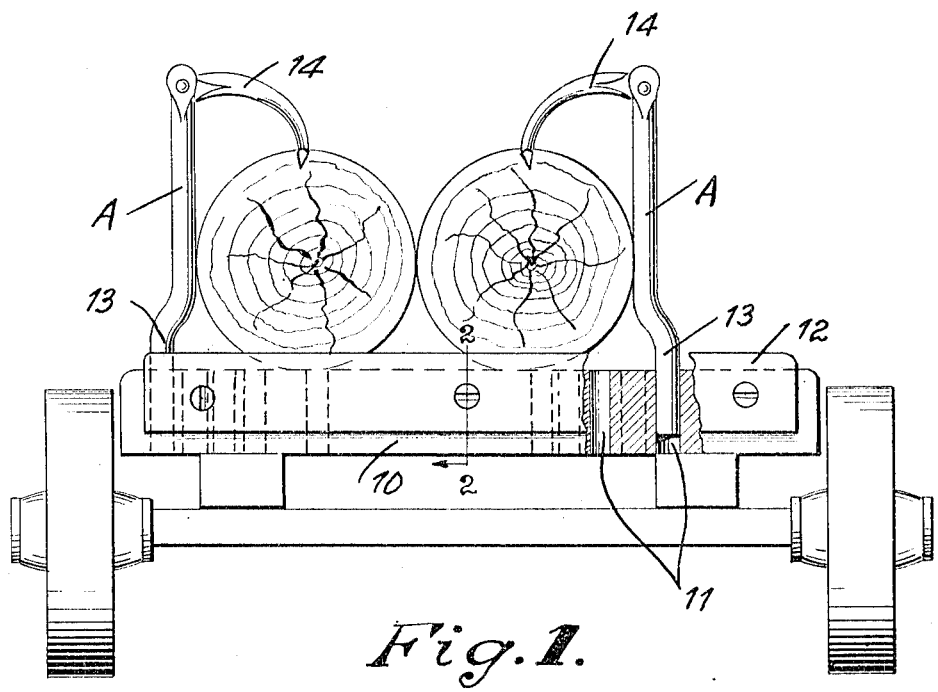
Fig. 1.
Fig. 2.
Fig. 3.
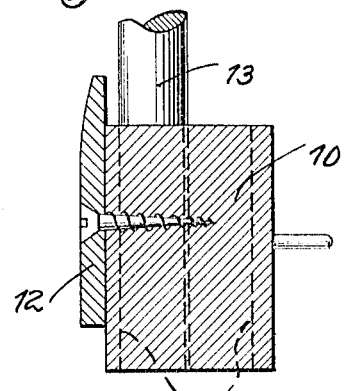
Witnesses
M. S. Watson
Henry T. Bright
Inventor
T. Johnston
By Chandler & Chandler
Attorneys

UNITED STATES PATENT OFFICE.

THOMAS JOHNSTON, OF DICKSON, TENNESSEE.

LOAD-RETAINING DEVICE FOR LOGGING-WAGONS.

1,089,767.   Specification of Letters Patent.   Patented Mar. 10, 1914.

Application filed June 12, 1913. Serial No. 773,279.

*To all whom it may concern:*

Be it known that I, THOMAS JOHNSTON, a citizen of the United States, residing at Dickson, in the county of Dickson, State of Tennessee, have invented certain new and useful Improvements in Load-Retaining Devices for Logging-Wagons; and I do hereby declare the following to be a full, clear, and exact description of the invention, such as will enable others skilled in the art to which it appertains to make and use the same.

This invention relates to load retaining devices for logging wagons.

The object of the invention resides in the provision of an improved load retaining device for logging wagons which will efficiently secure the logs upon the bolster of the wagon against either longitudinal or transverse movement.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a rear elevation of a fragment of a logging wagon partly in section and showing the invention applied; Fig. 2, a section on the line 2—2 of Fig. 1, and Fig. 3, a detail perspective view of one of the uprights or stakes employed in the device.

Referring to the drawings 10 indicates a wagon bolster which has formed therein a plurality of vertical stake receiving passages 11. Secured against one side of the bolster 10 is a plate 12 the upper edge of which projects above the top of the bolster. Adapted to be detachably engaged in the passages 11 are uprights or stakes A each of which is formed of a bar having an off-set lower end 13, said lower end being inserted in desired passages 11 as will hereinafter appear. Pivotally connected to the upper end of each stake A is a hook 14.

It will be noted that the structure previously described is associated with both the rear and front bolsters of a logging wagon and that the plates 12 at the front and rear of the wagon engage respective ends of the logs and prevent longitudinal movement of the logs on the bolsters. In loading a wagon provided with the invention the stakes A at the side from which the wagon is being loaded are removed and the stakes A at the other side of the wagon rotated so as to dispose the upper end of said stake outwardly of the lower end. After the logs have been loaded the stakes A previously removed are again applied in desired passages 11 with their upper ends disposed outwardly of their lower ends. The stakes A are then rotated to dispose their upper portions inwardly of their lower portions and this operation will force the logs resting upon the bolsters tightly together. The hooks 14 are then operated to drive their free ends into the adjacent logs and in this manner it will be obvious that the logs are securely held against both longitudinal and transverse movement.

What I claim is:—

In a load retaining device for wagons the combination of a bolster having a plurality of vertical passages therein, a pair of stakes adapted for interchangeable insertion in said passages, said stakes each having their terminals offset, and a hook pivoted to the upper end of each stake.

In testimony whereof, I affix my signature, in the presence of two witnesses.

THOMAS JOHNSTON.

Witnesses:
 W. A. BARNETT,
 J. E. BRAWN.

---

Copies of this patent may be obtained for five cents each, by addressing the "Commissioner of Patents, Washington, D. C."